United States Patent [19]

Corteg et al.

[11] 4,319,766
[45] Mar. 16, 1982

[54] VEHICLE TRAILER HITCH

[75] Inventors: Walter V. Corteg, Utica; Jack K. Gillies, Highland; Alfred B. Sauer, Farmington Hills, all of Mich.

[73] Assignee: General Motors Corporation, Detroit, Mich.

[21] Appl. No.: 162,757

[22] Filed: Jun. 25, 1980

[51] Int. Cl.³ .............................................. B60D 1/06
[52] U.S. Cl. .................................... 280/511; 280/432; 280/446 R; 73/862.04; 73/862.57
[58] Field of Search ................... 280/511, 432, 446 R; 73/862.04, 862.57

[56] References Cited

U.S. PATENT DOCUMENTS

| | | | |
|---|---|---|---|
| 2,564,520 | 8/1951 | Blasdell | 280/511 X |
| 3,116,940 | 1/1964 | Jines | 280/511 X |
| 3,217,536 | 11/1965 | Motsinger et al. | 73/147 X |
| 3,858,907 | 1/1975 | Van Raden | 280/422 |

OTHER PUBLICATIONS

Perry, et al., "The Strain Gauge Primer", pp. 222-223, (1955).

Primary Examiner—Joseph Paul Brust
Attorney, Agent, or Firm—Patrick M. Griffin

[57] ABSTRACT

The ball element of a ball type trailer hitch is separated along a horizontal plane of bisection and into two substantially hollowed out ball halves. The threaded outer perimeter of a wheel type vertical load measuring transducer is threaded to the inside of the ball halves at the horizontal plane of bisection. The base of the trailer hitch has a vertical stud which extends through a vertical cylindrical bore in the lower ball half and is attached to the center of the transducer. The ball element moves vertically downward under loading. This movement causes elastic bending of the spokes of the transducer. Such elastic bending is measured by strain gauges attached to the spokes.

3 Claims, 4 Drawing Figures

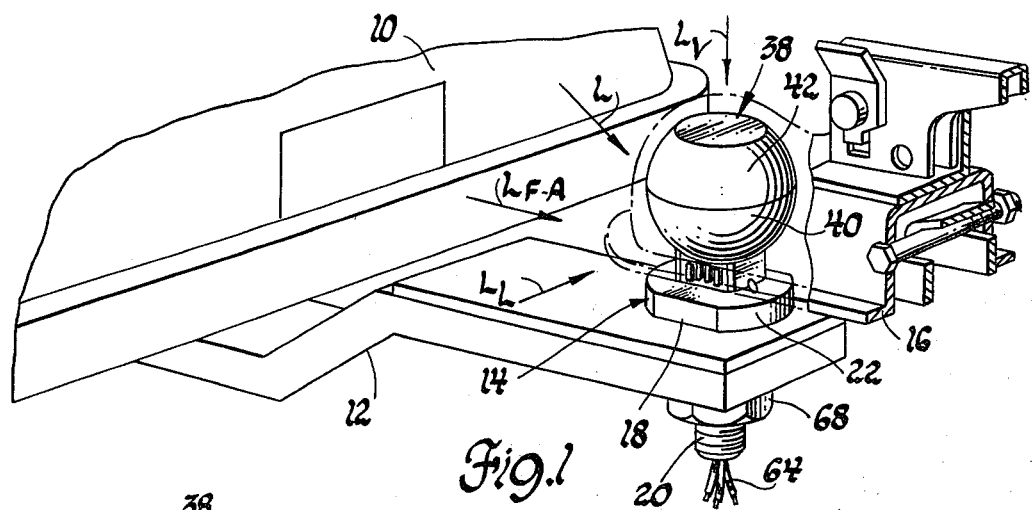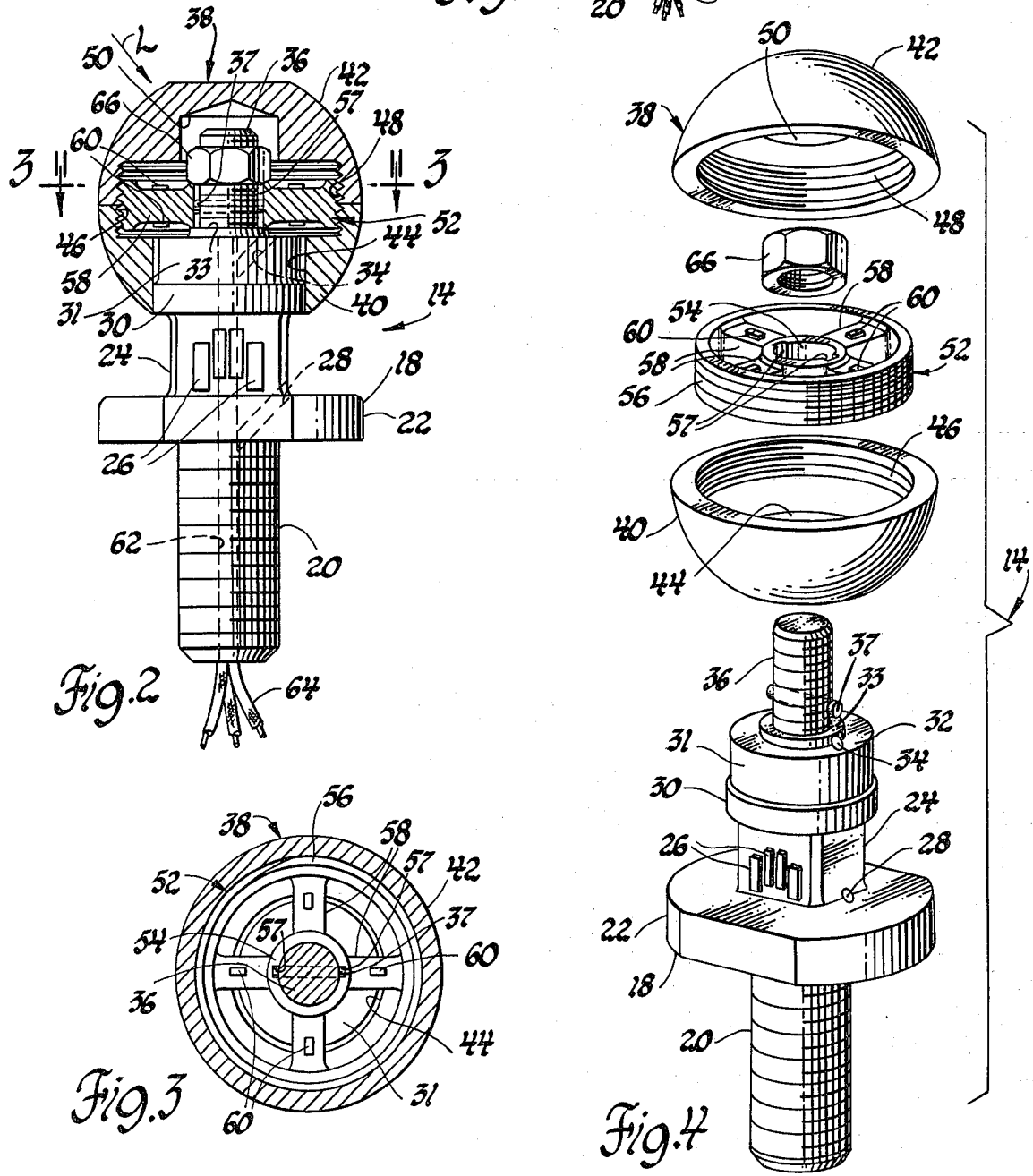

VEHICLE TRAILER HITCH

BACKGROUND OF THE INVENTION

This invention relates to vehicle trailer hitches and more specifically to a vehicle ball type trailer hitch which includes a transducer for measuring the vertical component of loads induced on the trailer hitch by a trailer attached thereto.

DESCRIPTION OF THE PRIOR ART

Devices to measure tongue loads induced by a trailer on a vehicle trailer hitch must contend with the fact that the vertical component of such loads will have a magnitude of perhaps 200 or 300 pounds while the component of such loading in the lateral direction may run as high as 900 pounds and as high as 4,000 pounds in the fore and aft direction. In order to isolate and measure the vertical component of such loads, some way must be found to incorporate a suitable transducer into the hitch. Standard ball type trailer hitches are typically made of heavy steel castings or machinings. While a transducer attached directly to a surface of such a standard trailer hitch is sufficiently sensitive to measure the larger, non-vertical loads, it will not be sufficiently sensitive to measure the smaller vertical loads, and the amplification necessary to make such signals readable adds excessive noise. Attempts have been made to locate vertical load transducer units between the ball element and base of a standard ball type hitch. These units are large and heavy and have so changed the configuration, weight and moment arm of the hitch that the signals have been unrepresentative of actual conditions. Such units are also subject to excessive "cross-talk", that is, mixing of vertical and lateral signals. Suitable transducers exist which separate vertical from horizontal loads, allow the use of low gain amplifiers, and which are not subject to "cross-talk". However, no way has been found to suitably incorporate such transducers within a standard ball type trailer hitch.

SUMMARY OF THE INVENTION

The subject invention solves the problem of incorporating a suitable vertical load measuring transducer within a standard ball type trailer hitch. The ball element is horizontally bisected into upper and lower halves which are substantially hollowed out. A vertical cylindrical bore extends through the lower half of the ball element. A wheel type transducer of conventional design is threaded around its perimeter. Each half of the ball element is threaded to the transducer to securely and removably join the ball halves and transducer together and locate the transducer in the horizontal plane of bisection of the ball element. The ball element is then slidably mounted on the base by vertically directed lands on the base which cooperate with the cylindrical bore in the lower half of the ball element. The transducer is rigidly attached near its center to a stud which extends upward from the base. Thus, the trailer hitch has the same outward configuration as a standard ball type trailer hitch.

In operation, loading on the ball element moves the ball element vertically downwardly as the cylindrical bore in the ball element slides on the vertical lands on the base. This movement of the ball element elastically deflects the perimeter of the transducer relative to the center thereof, which is stationary on the base. The elastic bending is measured and monitored by a standard strain gauge circuit. The transducer is located at the zero moment axis of the ball element and its design and the gauging associated with it make it inherently unresponsive to any signals other than those caused by the vertical component of loading on the ball element. All loading on the trailer hitch is the same as on a standard trailer hitch.

It is therefore an object of the invention to provide a ball type trailer hitch which wholly contains therein a load measuring transducer and is yet the same size and shape as a standard ball type hitch. It is another object of the invention to provide such a hitch wherein the transducer will isolate and measure the vertical component of loading on the hitch without "cross-talk" or noise. It is a further object of the invention to provide such a hitch wherein the transducer is located at the zero moment axis of the hitch so that the moment arms of loads on the hitch as measured by the transducer are identical to those in a standard ball type trailer hitch.

BRIEF DESCRIPTION OF THE DRAWINGS

The above objects of the invention will be apparent from the following description and the drawings in which:

FIG. 1 is a view of a vehicle incorporating a trailer hitch according to this invention for attaching a trailer thereto;

FIG. 2 is an enlarged view of the base, ball element and transducer, with the ball element and transducer in section;

FIG. 3 is a sectional view taken along the line 3—3 of FIG. 2; and

FIG. 4 is an exploded perspective view of the ball element and the base.

DETAILED DESCRIPTION OF THE DRAWINGS

Referring to FIG. 1, a vehicle generally designated 10 is shown with a towing bar 12 attached thereto. The ball type trailer hitch 14 of the invention is conventionally attached to the towing bar, and the tongue 16 of a trailer sits on the trailer hitch 14. The vertical, fore and aft, and lateral component directions of a typical load on the trailer hitch are respectively designated by arrows $L_V$, $L_{F-A}$, and $L_L$.

Referring to FIG. 4, a trailer hitch base designated generally at 18 is machined from high strength material, such as stainless steel. The base 18 includes a threaded lower stud 20 which terminates in plinth 22. Squared off shank 24 includes conventional strain gauges 26 for measuring the fore and aft and lateral loads. A wiring passage 28 for the wiring for strain gauges 26 opens to the shank at the juncture thereof with the plinth. Cylindrical vertical land 30 merges into an offset cylindrical vertical land 31 which in turn terminates in an outer radial shoulder 32 and an inner offset radial shoulder 33 of a smaller diameter. Another wiring passage 34 opens at the juncture of shoulders 32 and 33. An upper threaded stud 36 projects from the shoulder 33. A metal pin 37 is included in stud 36 and extends outwardly on each side thereof serving to locate elements described below.

A ball element 38 of stainless steel is bisected along a horizontal plane into lower ball half 40 and upper ball half 42. As seen in FIG. 2, the interior of ball element 38 is machined to provide three vertical, concentric and intersecting cylindrical bores of varying diameters.

Lower bore 44 extends through lower ball half 40 and has a diameter closely conforming to that of vertical land 30 and an axial length equivalent to the height of lands 30 and 31. Lower bore 44 opens into an internally threaded bore 46 which opens to a like bore 48 of ball half 42. Bore 48 in turn opens into an upper closed bore 50.

Referring now to FIGS. 3 and 4, a conventional vertical load measuring transducer 52, such as shown on pages 222, 223 of *The Strain Gauge Primer* by C. C. Perry and H. R. Lissner, measures the vertical component of loading thereon without responding to horizontal loading. Transducer 52 includes a journaled hub 54 having a bore matching the diameter of stud 36, and an externally threaded perimeter or rim 56. Hub 54 has described therein a two sided slot 57 which matches the ends of pin 37 which serves to locate it on stud 36 as described below. Four identical spokes or beams 58 connect hub 54 and rim 56. Eight strain gauges 60 are attached one each to the upper and lower surface of each beam 58 and connected together in a full bridge circuit. Such a circuit with eight gauges is sensitive enough to require only low, if any, amplification and its electrical output is independent of the point of load application, as outlined in *The Strain Gauge Primer*, referred to above.

Referring now to FIG. 2, to assemble the trailer hitch, transducer 52 is threaded into lower ball half 40 to about half its thickness, and the wiring from strain gauges 60 is fed into wiring passage 34 which connects with a central wiring passage 62 extending through the base 18. This wiring and the wiring from strain gauges 26, which feeds into passage 62 from wiring passage 28, designated 64, exits from the lower end of stud 20. The lower ball half 40 is slidably mounted on land 30 as the upper threaded stud 36 is inserted through hub 54. Pin 37 slides in slots 57 to locate hub 54 so that it does not turn with respect to stud 36, thus protecting the wiring from gauges 60. When hub 54 seats on shoulder 33, the lower ball half 40 is threadedly adjusted relative to the transducer to align the opening of bore 44 with the lower radial shoulder of land 30. A nut 66 is then threaded on stud 36 to fix hub 54 to shoulder 33. The upper ball half 42 is then threaded onto the transducer until it seats on the lower ball half 40. This locates the transducer 52 in the horizontal plane of bisection of ball element 38 and connects the ball element to the transducer to ensure that all loads on the ball element are transferred to the transducer when the ball element moves with respect to the base 18 as lower bore 44 moves vertically on land 30. While the transducer 52 is the only connection between the ball element 38 and base 18, its strength is sufficient to withstand the lateral and vertical loading. The hitch 14 is mounted on the bar 12 by inserting stud 20 through an opening in the bar and securing hitch 14 by nut 68. The wiring 64 is connected to a conventional monitor which receives the signals from gauges 60 in a bridge circuit arrangement as well as gauges 26.

The operation of the trailer hitch will now be described with reference to FIGS. 1 and 2. A load generally designated by the arrow "L" has vertical, fore and aft and lateral components designated by the arrows "$L_V$," "$L_{F-A}$" and "$L_L$". The component $L_V$ will elastically bend beams 58 as the ball element and rim 56 of the transducer move relative to hub 54 and base 18, with this movement being guided by bore 44 and land 30. This elastic bending is measured by the gauges 60. Components $L_L$ and $L_{F-A}$, while larger in magnitude, cause little deformation of beams 58. Such deformation is essentially symmetrical about the horizontal plane of bisection of the ball element and any signals generated by beams 58 are cancelled out by the bridge circuit. Thus, the signals from the transducer 52 corresponding to the vertical component $L_V$ are free from "cross-talk" and the low amplification eliminates excessive noise. The components $L_L$ and $L_{F-A}$ are adequately measured by the gauges 26 on the heavier shank portion 24.

Thus, this invention provides a ball type trailer hitch which incorporates vertical load measuring transducers capable of isolating and measuring the vertical component of loading on the trailer hitch.

The embodiments of the invention in which an exclusive property or privilege is claimed are defined as follows:

1. A trailer hitch for monitoring the vertical component of loading induced thereon by an attached trailer comprising:
   a base adapted to be attached to a vehicle and including a first vertically directed guide means,
   a partially hollow ball element,
   a second vertically directed guide means associated with the ball element to slidably mount the ball element on the base for relative vertical movement with respect to the base,
   a vertical load measuring transducer within the ball element,
   means securing one portion of the transducer to the ball element and locating the transducer in the horizontal plane of bisection of the ball element to transfer vertical loads from the ball element to the transducer,
   means fixing another portion of the transducer to the base,
   vertical loads on the ball element elastically bending the one portion of the transducer relative to the other portion thereof as the ball element slidably moves relative to the base, the vertical loads on the ball element being measured by monitoring the elastic bending of the transducer with respect to the base.

2. A vehicle trailer hitch containing a vertical load measuring transducer to monitor the vertical component of loading applied to the vehicle by a trailer comprising:
   a base adapted to be rigidly attached to the vehicle and including a first vertical guide means,
   a partially hollow ball element separated along the horizontal plane of bisection thereof into upper and lower halves,
   a vertical load measuring transducer,
   cooperating means on the ball element halves and one portion of the transducer removably securing the ball halves to the transducer to thereby assemble the ball element and locate the transducer in the horizontal plane of bisection of the ball element,
   a second vertically directed guide means associated with the ball element to slidably mount the ball element on the base for vertical movement with respect to the base,
   means acting between the ball element and a first portion of the transducer to transfer loads from the ball element to the transducer,
   and means rigidly attaching a second portion of the transducer to the base whereby loading of the transducer by the ball element will elastically bend the transducer relative to the base, the vertical loads on the ball element being measured by monitoring the elastic bending of the transducer with respect to the base as the ball element moves vertically relative to the base in response to loading thereon.

3. A vehicle trailer hitch containing a vertical load measuring transducer for monitoring the vertical component of loading induced on the vehicle trailer hitch by a trailer comprising:

a base adapted to be rigidly joined to the vehicle and including a first vertically directed guide means, a partially hollow ball element separated along the horizontal plane of bisection thereof to provide upper and lower halves meeting at the juncture thereof, securing means on each ball half adjacent the juncture thereof, a vertical load measuring transducer having a hub, a perimeter, and elastic elements joining the hub to the perimeter, securing means on the perimeter cooperable with the securing means on the ball halves to secure the transducer to the ball halves to each other, means securing the hub of the transducer to the base to mount the ball element and transducer on the base for movement relative thereto, and a second vertically directed guide means associated with the ball element to slidably guide vertical movement of the ball element with respect to the base, whereby vertical loads on the ball element may be measured by monitoring the elastic bending of the transducer elastic elements as the ball element and the perimeter of the transducer move vertically relative to the hub of the transducer and the base.

* * * * *